(12) United States Patent
Wilkes et al.

(10) Patent No.: US 8,523,424 B2
(45) Date of Patent: Sep. 3, 2013

(54) PROCESS FOR REDUCING THE SET TIME OF A SETTABLE SLURRY

(75) Inventors: Ian Paul Wilkes, Loughborough (GB); Danny Lynham, Yorkshire (GB)

(73) Assignee: BPB Limited (GB)

(*) Notice: Subject to any disclaimer, the term of this patent is extended or adjusted under 35 U.S.C. 154(b) by 0 days.

(21) Appl. No.: 12/936,781

(22) PCT Filed: Mar. 23, 2009

(86) PCT No.: PCT/GB2009/050267
§ 371 (c)(1),
(2), (4) Date: Apr. 27, 2011

(87) PCT Pub. No.: WO2009/125210
PCT Pub. Date: Oct. 15, 2009

(65) Prior Publication Data
US 2011/0247526 A1 Oct. 13, 2011

(30) Foreign Application Priority Data
Apr. 9, 2008 (GB) .................................. 0806432.1

(51) Int. Cl.
| | | |
|---|---|---|
| B28C 5/00 | (2006.01) |
| B28C 5/46 | (2006.01) |
| B28C 7/00 | (2006.01) |
| C04B 14/00 | (2006.01) |
| C04B 16/00 | (2006.01) |
| C04B 24/00 | (2006.01) |
| C04B 28/10 | (2006.01) |
| C04B 7/38 | (2006.01) |
| C04B 9/04 | (2006.01) |
| C04B 11/00 | (2006.01) |
| C04B 2/10 | (2006.01) |

(52) U.S. Cl.
USPC ................... 366/2; 366/6; 106/722; 106/764; 106/772

(58) Field of Classification Search
USPC .......................... 106/722, 764, 772; 366/2, 6
See application file for complete search history.

(56) References Cited

U.S. PATENT DOCUMENTS

| | | | | |
|---|---|---|---|---|
| 2,292,616 A | * | 8/1942 | Dailey ........................ | 106/720 |
| 3,262,799 A | | 7/1966 | McCleary et al. | |
| 3,359,146 A | | 12/1967 | Lane et al. | |
| 3,563,517 A | * | 2/1971 | Harriman .......................... | 366/6 |
| 4,007,921 A | * | 2/1977 | Zingg ............................. | 366/10 |
| 4,452,638 A | * | 6/1984 | Gallus ........................... | 106/669 |
| 5,346,550 A | * | 9/1994 | Kunzi et al. ................... | 106/709 |
| 5,709,743 A | | 1/1998 | Leture et al. | |
| 6,221,151 B1 | | 4/2001 | Campbell et al. | |
| 7,284,898 B2 | * | 10/2007 | Duell et al. ................ | 366/152.1 |
| 2006/0244183 A1 | | 11/2006 | Wittbold et al. | |

FOREIGN PATENT DOCUMENTS

| | | |
|---|---|---|
| EP | 0 142 017 | 5/1985 |
| JP | 11228134 | 8/1999 |
| WO | 2006/115496 | 11/2006 |

* cited by examiner

*Primary Examiner* — Kaj K Olsen
*Assistant Examiner* — Karam Hijji
(74) *Attorney, Agent, or Firm* — GrayRobinson, P.A.; Michael J. Colitz, III

(57) ABSTRACT

A process for reducing the set time a plaster slurry. The process comprises the steps of, providing a pre-determined amount of water, providing a pre-determined amount of the plaster, mixing the water and the plaster together at a first time to form a slurry, and, re-directing a portion of the slurry formed at the first time to combine with slurry formed at a second time.

3 Claims, 7 Drawing Sheets

PROCESS FOR REDUCING THE SET TIME OF A SETTABLE SLURRY

CLAIM OF PRIORITY

This application is a continuation of and claims priority under 35 U.S.C. §371 to International Application No. PCT/GB2009/050267 filed on Mar. 23, 2009, which claims priority to GB 0806432.1 filed on Apr. 9, 2008. The contents of both aforementioned applications are incorporated herein by reference.

The present invention relates to a process for reducing the set time of a settable cementitious slurry and particularly, but not exclusively, to a process for reducing the set time of an aqueous slurry of calcium sulphate hemihydrate.

Gypsum, also known as calcium sulphate hemihydrate is a well known material in the building trade. Gypsum based products such as plaster boards, are prepared from an aqueous slurry of calcium sulphate hemihydrate. The calcium sulphate hemihydrate is known to be mixed with a fibre, and various other additives that increase moisture resistance and fire resistance, and water, and the board is formed by sandwiching a core of the formed slurry between two sheets of thick paper. When the slurry sets and is dried, the sandwich becomes rigid and strong enough for use as a building material.

As the calcium sulphate hemihydrate hydrates, i.e. combines with the water, an interlocking matrix of calcium sulphate di-hydrate crystals are formed. The set time of the slurry depends on a number of factors including the mixing temperature, pH, particle size and the addition of additives. For example, in U.S. Pat. No. 5,575,844, a foam is introduced into the slurry to aerate the slurry. However, this method creates a porous plaster product which has a density which is typically too low for commercial purposes.

Commercial plaster is usually provided with an excess of water. Accordingly, the excess water is typically purged, dried or allowed to evaporate from the gypsum based water suspension to form the final product. Drying the wet gypsum however is a time consuming process. Moreover, if additives are used to increase the rate of set of the gypsum, then careful control of the addition is needed in order to achieve a consistent quality of structure.

We have now devised an improved process for reducing the set time of a settable slurry.

According to a first aspect of the present invention there is provided a process for reducing the set time of a settable cementitious slurry, the process comprising:
  providing a pre-determined amount of water;
  providing a pre-determined amount of the slurry forming substance;
  mixing the pre-determined amount of water and the predetermined amount of slurry forming substance together at a first time, to form an aqueous slurry; and,
  re-directing a portion of the aqueous slurry formed at the first time to combine with aqueous slurry formed at a second time.

Preferably, the aqueous slurry is formed by mixing the pre-determined amount of water with the predetermined amount of slurry forming substance in a mixer.

Preferably, the mixer comprises an input and an output.

The pre-determined amount of water and predetermined amount of slurry forming substance is preferably introduced into the mixer via the input, at a specified rate, to control the ratio of the water to the slurry forming substance.

The aqueous slurry formed at the first time is preferably formed before the aqueous slurry formed at the second time.

In this manner, the aqueous slurry formed at the first time undergoes partial setting with respect to the aqueous slurry formed at the second time.

Preferably, the portion of aqueous slurry formed at the first time is extracted from the mixer and redirected back into the mixer via the input, at a specified rate, with the water and calcium sulphate hemihydrate.

Alternatively, the portion of aqueous slurry formed at the first time is preferably extracted from the outlet of the mixer and is re-directed into the mixer via the input, at a specified rate, with the water and calcium sulphate hemihydrate.

More preferably, the portion of aqueous slurry is extracted from the outlet of the mixer and reintroduced into the outlet following a time delay.

Preferably, the slurry forming substance comprises substantially calcium sulphate hemihydrate.

In each of the above cases, the redirected aqueous slurry formed at the first time is partially nucleated with respect of the aqueous slurry formed at the second time to which it is recombined, to increase the set rate of the slurry, thereby allowing a faster development of a network monolith structure.

According to a second aspect of the present invention there is provided a method of preparing gypsum based products, the method comprising the process of the first aspect.

The preferred embodiments of this invention may now be described by way of example only and with reference to the accompanying drawings in which.

Figure 1:
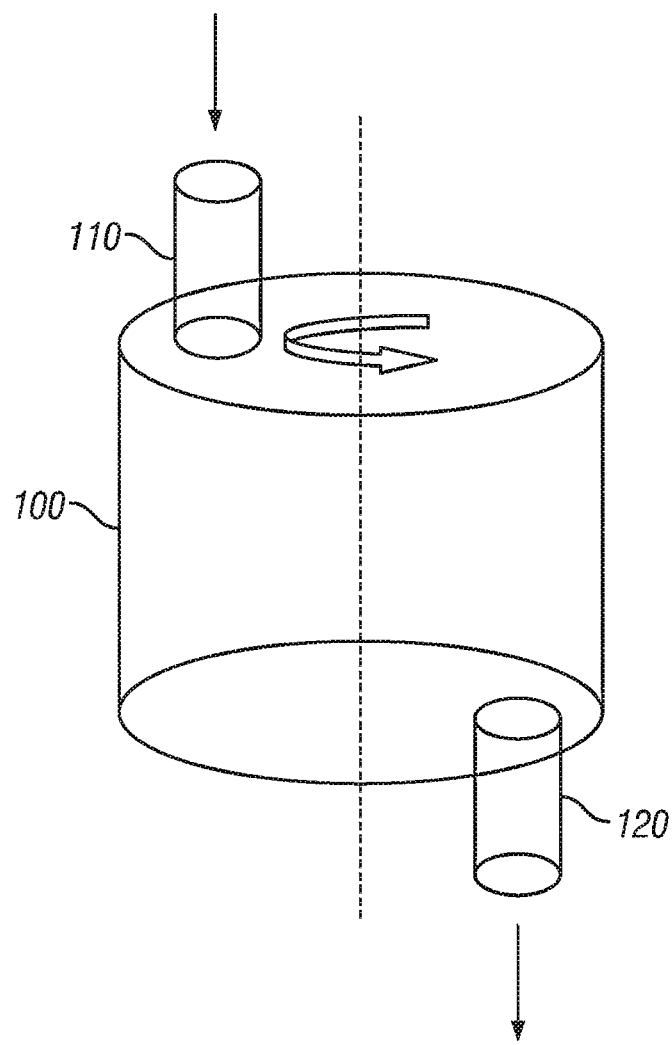
FIG. 1 is a schematic illustration of a known slurry forming process.

Referring to FIG. 1 there is shown a known process for mixing the constituents of substantially gypsum plaster. The process comprises the use of a mixer 100 comprising an inlet 110 schematically as a number of inlets for introducing water and calcium sulphate hemihydrate (hereinafter referred to as gypsum) into the mixer and an outlet 120 for removing the mixed slurry formed therein from the mixer 100.

The water and gypsum are fed into the mixer 100 at a specified rate using a pump (not shown) to control the ratio of the constituents within the mix.

Referring to FIGS. 2 to 7, there is shown a process according to the present invention. The process is a development over that shown in FIG. 1 and further comprises a feedback duct for re-directing a portion of the slurry with later formed slurry to reduce the set time of the slurry.

Figure 2:
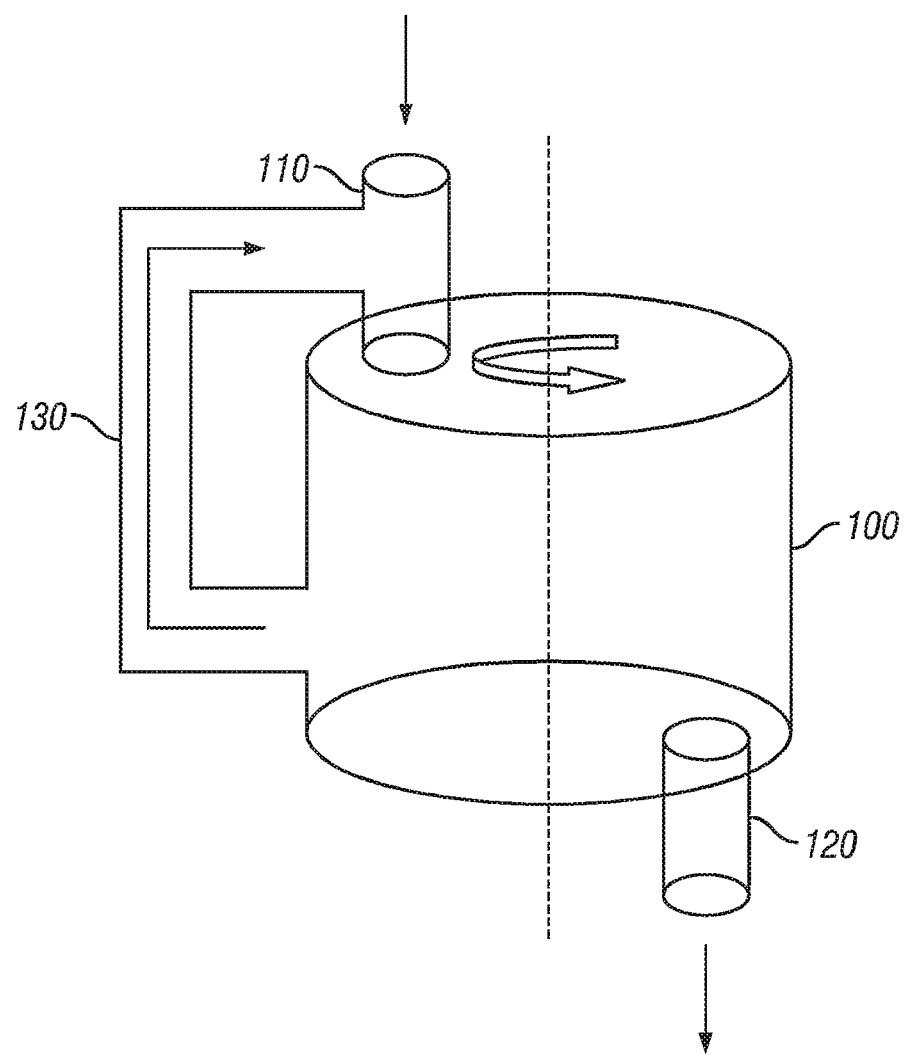
FIG. 2 is a schematic illustration of the slurry forming process according to the present invention.

Referring to a first embodiment of the present invention, as illustrated in FIG. 2, there is provided a duct 130 and a pump (not shown). The duct 130 extends from the base of the mixer 100 to the mixer inlet 110. The pump (not shown) pumps a portion of the aqueous slurry at a controlled rate using a controller (not shown), from the mixer back to the inlet where it combines with the unmixed constituents, and is re-input into the mixer 100 with the separate constituents. The mixed slurry is subsequently extracted from the mixer 100 via the outlet 120 and is used to form gypsum based products such as plasterboards.

Figure 3:
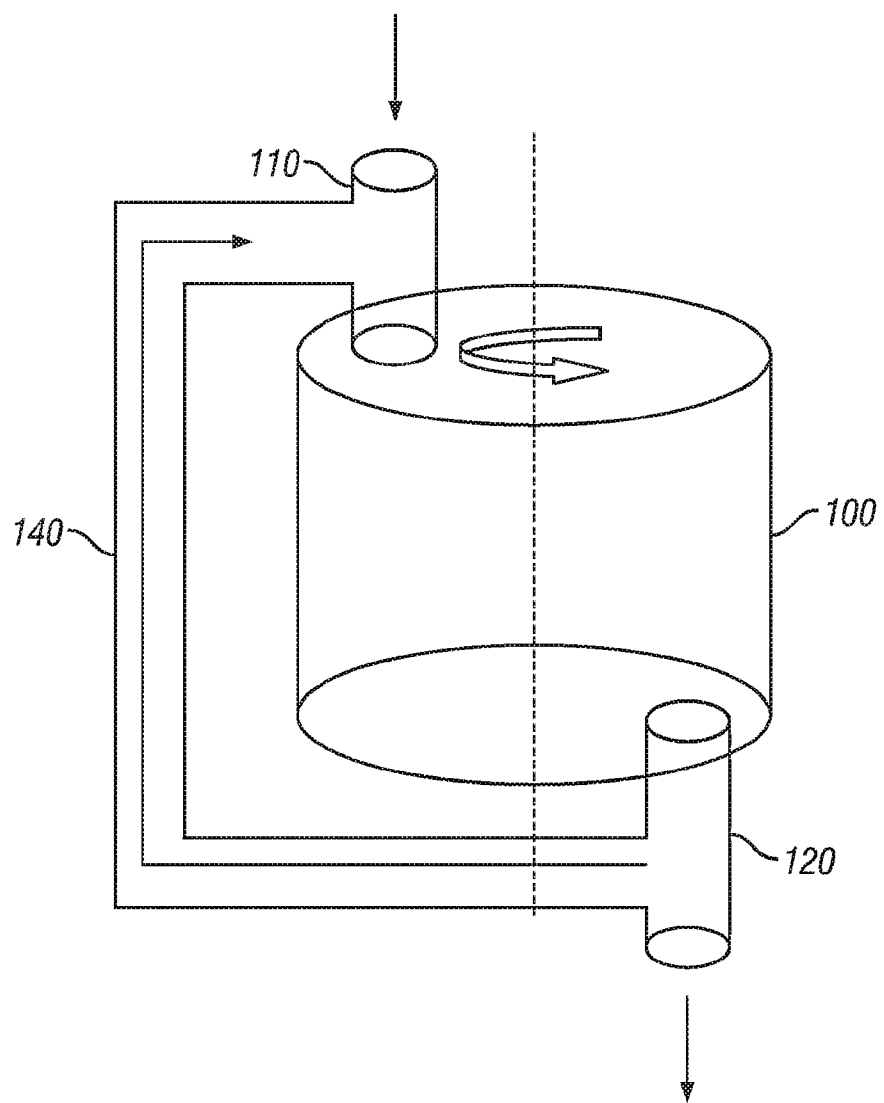
FIG. 3 is a schematic illustration of an alternative slurry forming process according to the present invention.

Referring to a second embodiment of the present invention, as illustrated in FIG. 3, there is provided a duct 140 and a pump (not shown). The duct 140 extends from the outlet 120 of the mixer 100 to the mixer inlet 110. The pump (not shown) pumps a portion of the aqueous slurry at a controlled rate using a controller (not shown), from the outlet 120 back to the inlet 110 where it combines with the unmixed constituents, and is re-input into the mixer 100 with the separate constituents.

Figure 4:
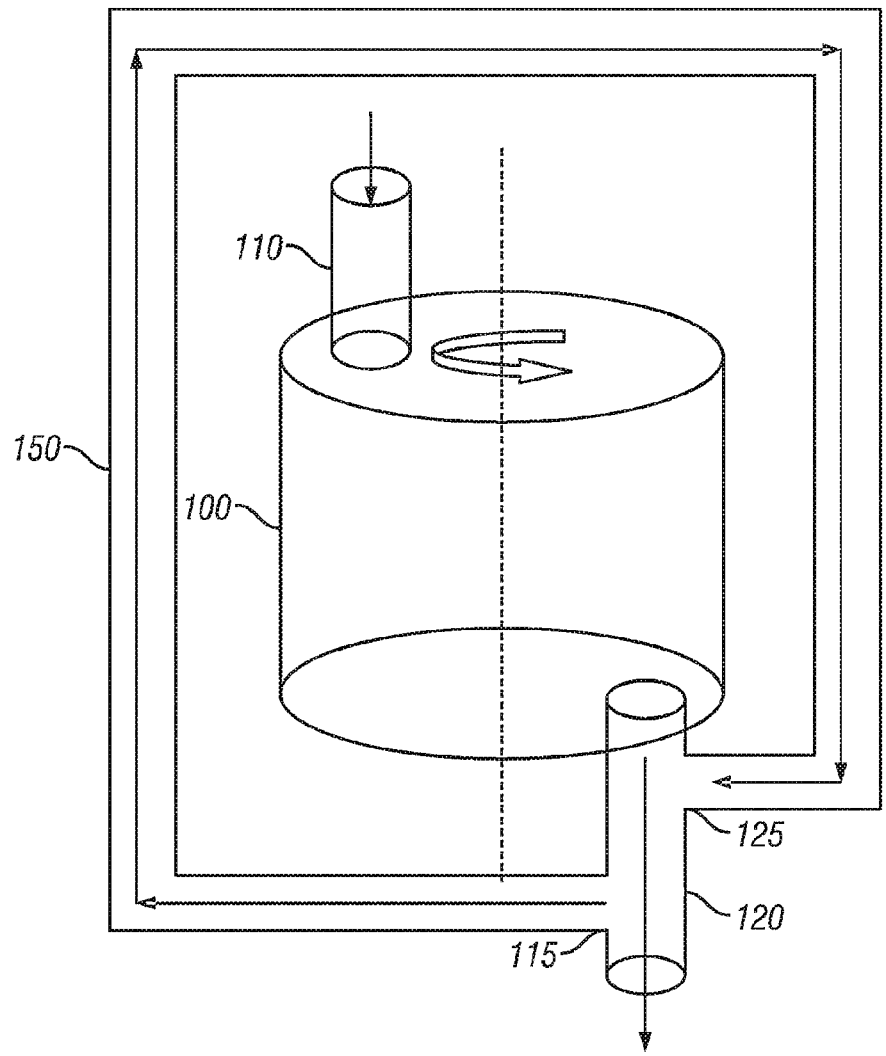
FIG. 4 is a schematic illustration of a further alternative slurry forming process according to the present invention.

According to a third embodiment of the present invention, as illustrated in FIG. 4, there is provided a duct 150 and a pump (not shown). The duct 150 extends from the lower portion 115 of the outlet 120 of the mixer 100 along a path, and back to the outlet 120 at a position 125 higher than the duct outlet 115. The pump (not shown) pumps a portion of the aqueous slurry at a controlled rate using a controller (not shown), from the outlet 120, back to the outlet 120, where it combines with more recently formed aqueous slurry.

Figure 5:
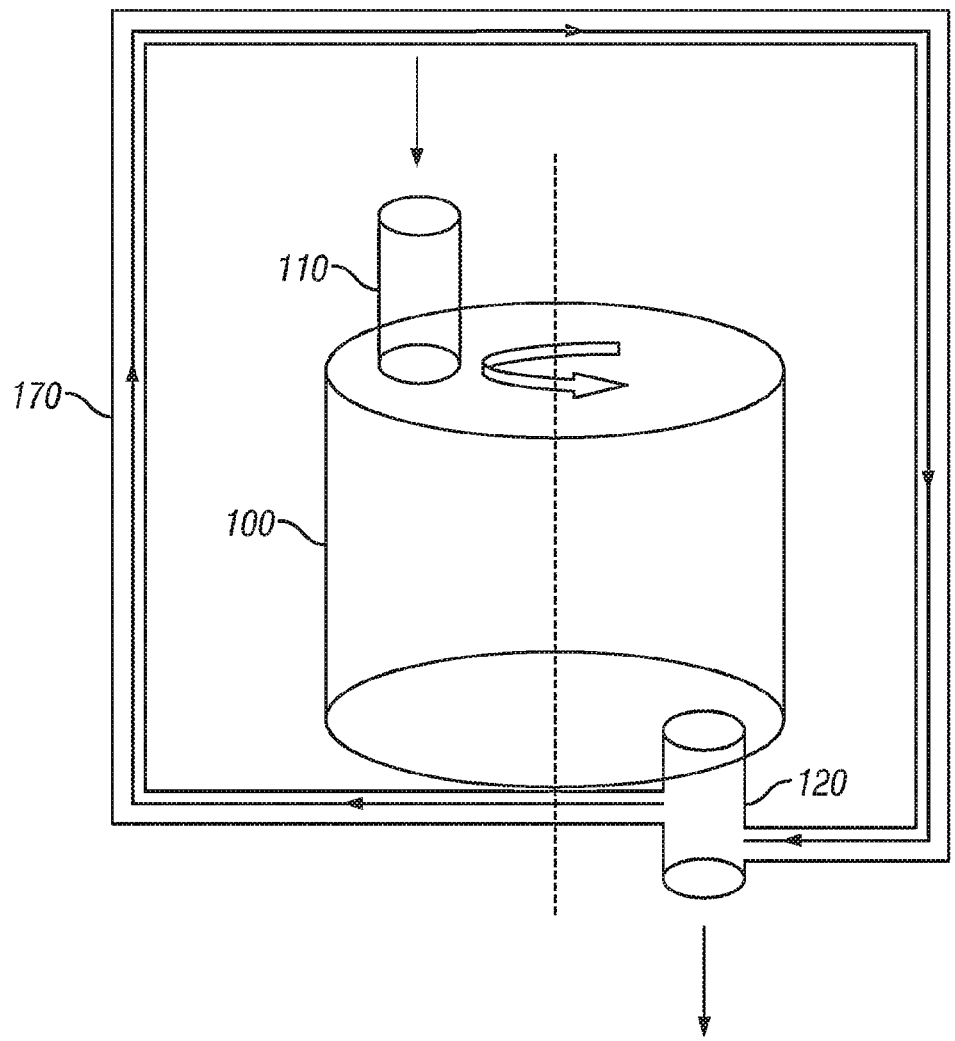
FIG. 5 is a schematic illustration of a further alternative slurry forming process according to the present invention.
Figure 6:
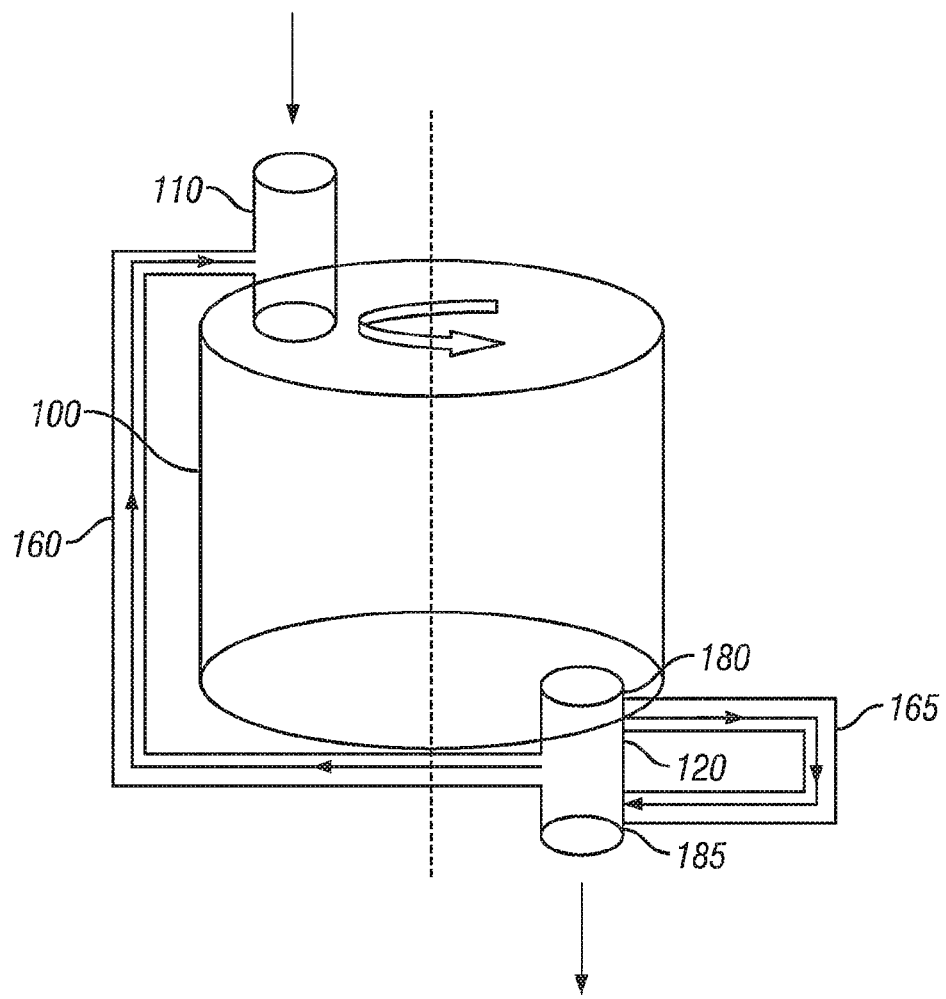
FIG. 6 is a schematic illustration of a further alternative slurry forming process according to the present invention.
Figure 7:
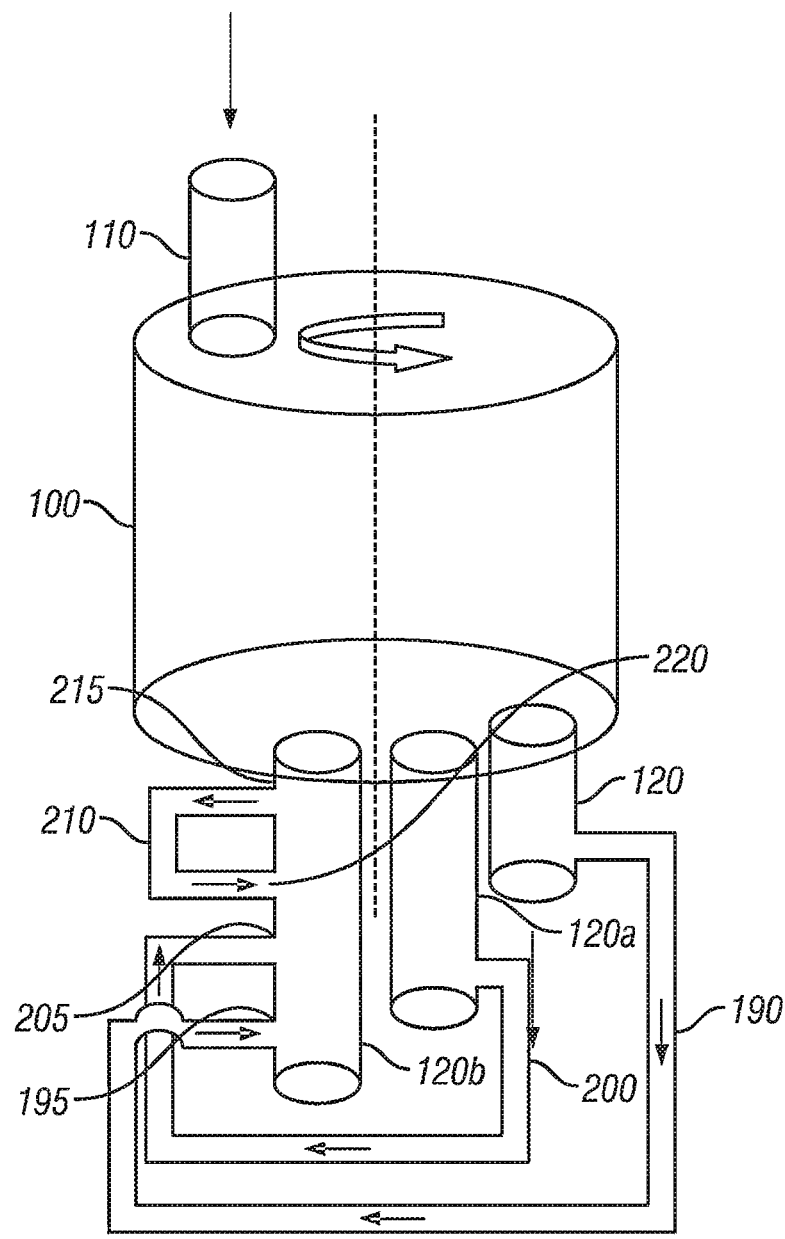
FIG. 7 is a schematic illustration of a further alternative slurry forming process according to the present invention.

Further embodiment of the present invention are schematically illustrated in FIGS. 5 to 7.

According to a fourth embodiment of the present invention, as illustrated in FIG. 5 there is provided the duct 170 and a pump (not shown). The duct 170 extends from the lower portion 115 of the outlet 120 of the mixer 100 along the path and back to the outlet 120 at a position 125 higher than the duct outlet 115. The pump (not shown) pumps the portion of the aqueous slurry at a controlled rate using a controller (not shown) from the outlet 120 back to the outlet 120 where it combines with later formed aqueous slurry.

According to a fifth embodiment of the present invention, as illustrated in FIG. 6, there is provided a duct 160 and a pump (not shown). The duct 160 extends from the outlet 120 of the mixer 100 along the path and back to the inlet 110 of the mixer. In addition there is a further duct 165 which extends from a duct inlet position 180 at a higher end of the mixer outlet 120 and forms a flow path back into the mixer outlet 120 at a lower duct inlet position 185. Thus some of the slurry from the mixer outlet is drawn out along this flow path through duct 165 and reintroduced within the mixer outlet at 185 in a controlled and timed manner.

According to a sixth embodiment of the present invention, as illustrated in FIG. 7, there is provided a series of mixer outlets 120, 120a and 120b extending from a mixer 100. The mixer outlet 120 is provided with a duct 190 which links mixer outlet 120 to mixer outlet 120b and slurry is extracted from mixer outlet 120 and reintroduced into mixer outlet 120b at a duct inlet 195. A duct 200 connects mixer outlet 120a with mixer outlet 120b. Slurry is drawn out from mixer outlet 120a and reintroduced into mixer outlet 120b at a duct inlet position 205. Finally, mixer outlet 120b has a further duct 210. Slurry is drawn from the mixer 120b at the duct outlet position 215 and reintroduced at a lower point in the mixer outlet 120b shown as the duct inlet point 220. In all cases the direction of the arrows indicates the direction of the slurry through the ducts along the flow path.

In each of the above embodiments, the portion of aqueous slurry that is extracted from the various positions within the process, becomes partially set with respect to the slurry to which is recombined with. The partially set slurry comprises nucleation sites around which the slurry can crystallise. In this manner, mixing the partially set slurry with more recently formed slurry (i.e. slurry which has undergone less hardening) is found to increase the set rate of the aqueous slurry passing from the outlet 120.

The set time for each of the above embodiments was compared with the set rate using the known process, as illustrated in FIG. 1, using an accelerator additive. The results revealed a reduction in the set time for the slurry using the process of the first embodiment when compared with the known process, and a greater reduction in set time using the process of the second embodiment. However, the greatest reduction in set time for the slurry was achieved by extracting a portion of the aqueous slurry from the outlet and recombining the portion with more recently formed slurry within the outlet, according to the third embodiment.

From the foregoing therefore, it is evident that plaster slurry formed with the process of the present invention, hardens more rapidly than untreated slurry and slurry which has been prepared with additives.

The invention claimed is:

1. A process for reducing the set time of a settable cementitous slurry, the process comprising:
providing an amount of water;
providing an amount of the slurry forming substance, the slurry forming substance comprising substantially calcium sulphate hemihydrate;
mixing said amount of water and said amount of slurry forming substance together at a first time to form an aqueous slurry; and
re-directing a portion of said aqueous slurry formed at said first time to combine with aqueous slurry formed at a second time, thereby reducing the set time of the cementitious slurry;
wherein said slurry is formed by mixing said amount of water and said amount of slurry forming substance in a mixer;
wherein the mixer comprises an input and an outlet; and
wherein said portion of aqueous slurry is extracted from said outlet of said mixer and re-introduced into said outlet following a time delay.

2. A process according to claim 1, wherein said aqueous slurry formed at the first time undergoes partial setting before being introduced with said aqueous slurry formed at the second time.

3. A method of preparing gypsum based products, the method comprising the process of claim 1.

* * * * *